(12) United States Patent
Matsumoto

(10) Patent No.: US 7,292,556 B2
(45) Date of Patent: Nov. 6, 2007

(54) CDMA RADIO DEVICE AND SIMPLE PATH ESTIMATING METHOD EMPLOYED THEREFOR

(75) Inventor: Mariko Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 964 days.

(21) Appl. No.: 10/642,692

(22) Filed: Aug. 19, 2003

(65) Prior Publication Data

US 2004/0047318 A1    Mar. 11, 2004

(30) Foreign Application Priority Data

Aug. 21, 2002   (JP)   ............... 2002-240037

(51) Int. Cl.
*H04B 7/216*   (2006.01)

(52) U.S. Cl. ..................... 370/335; 455/135

(58) Field of Classification Search ............. None
See application file for complete search history.

(56) References Cited

U.S. PATENT DOCUMENTS

| 6,356,542 | B1 * | 3/2002 | Hayata | 370/342 |
| 6,430,166 | B1 * | 8/2002 | Bejjani et al. | 370/320 |
| 6,650,692 | B2 * | 11/2003 | Inoue et al. | 375/147 |

FOREIGN PATENT DOCUMENTS

| JP | 10-032523 | 2/1998 |
| JP | 2000-244366 | 9/2000 |
| JP | 2000-278176 | 10/2000 |
| JP | 2000-286821 | 10/2000 |
| JP | 2001-267958 | 9/2001 |
| JP | 2002-26765 | 1/2002 |
| JP | 2002-164815 | 6/2002 |
| JP | 2003-273779 | 9/2003 |
| JP | 2003-289278 | 10/2003 |
| JP | 2004-056747 | 2/2004 |

OTHER PUBLICATIONS

Hamada et al, Performance Evaluation of the Path Search Process for the W-CDMA System, IEEE, pp. 980-984, 1999.*
Igura et al, A Low-power W-CDMA Demodulator using Specially-designed Micro-DSPs, IEEE, pp. 397-400, 2002.*

* cited by examiner

*Primary Examiner*—Frank Duong
(74) *Attorney, Agent, or Firm*—Young & Thompson

(57) ABSTRACT

A CDMA radio device is provided which is capable of reducing a hardware scale and providing more accurate path selection with low power consumptions. A down-sampling part outputs data of which sampling frequency is made lower than A/D sampling frequency. A correlator part performs correlation calculation of the data using specific spread codes designated in cell information to create a delay profile. A first path selection part selects a path in the delay profile and transfers selection information to an up-sampling part. The up-sampling part supplements delay profile data at sampling time that has been lost in the down-sampling part. A second path selection part transfers some location information of ultimately determined paths to a base station spread demodulation unit or a mobile station spread demodulation unit as a path timing signal.

14 Claims, 12 Drawing Sheets

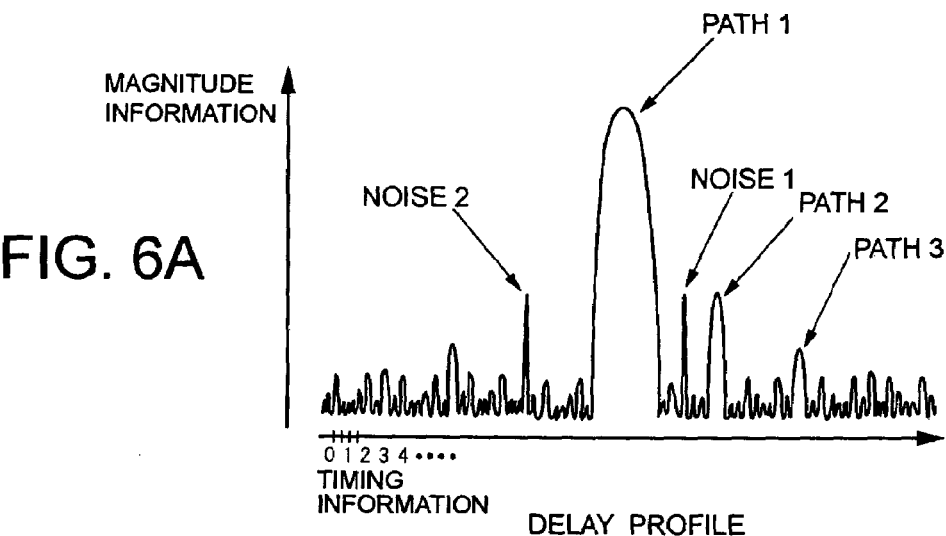
FIG. 6A DELAY PROFILE
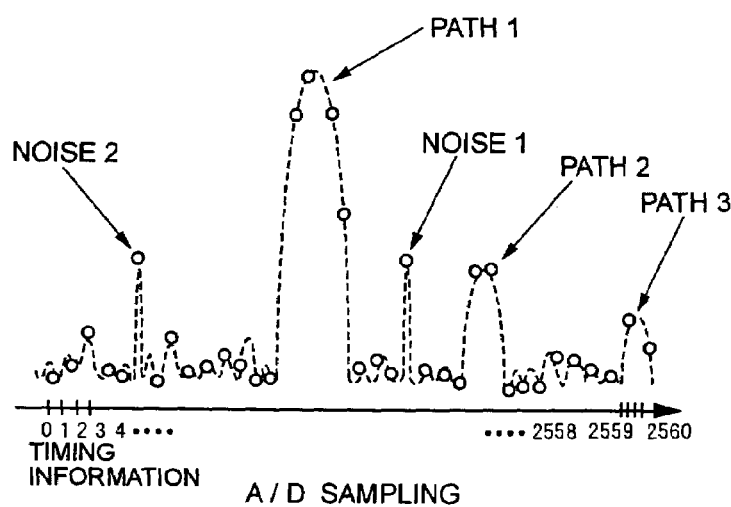
FIG. 6B A/D SAMPLING
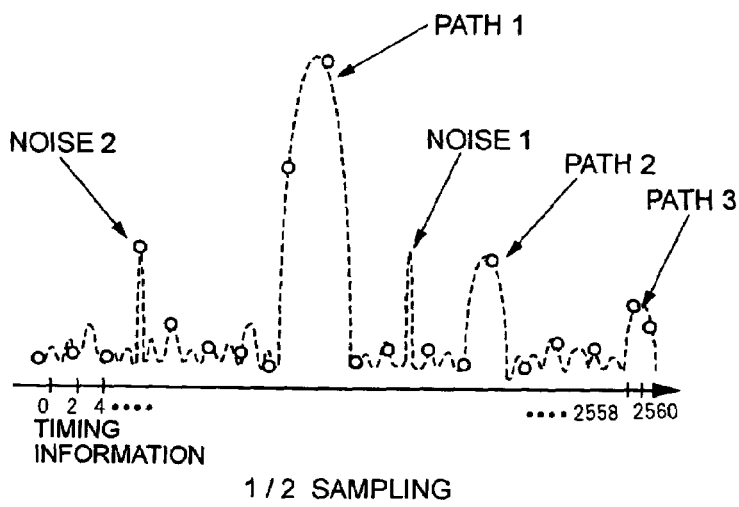
FIG. 6C 1/2 SAMPLING

CDMA RADIO DEVICE AND SIMPLE PATH ESTIMATING METHOD EMPLOYED THEREFOR

BACKGROUND OF THE INVENTION

1. Field of the Invention

The present invention relates to a CDMA (Code Division Multiple Access) radio device and a simple path estimating method employed therefor and, more particularly, to a path estimating method employed in a CDMA radio device.

2. Description of the Related Art

Conventionally, path estimation has been performed in receiving operations of a CDMA radio system. FIG. 6A shows the characteristics of a delay profile generated due to multipath of a transmission line in the CDMA radio system. As shown in FIG. 6A, the delay profile consists of magnitude information about electric power, power routes, or the like, and timing information for detecting path timing. In this transmission line, there are three paths of a path (1), a path (2), and a path (3), and lots of noises, notably, large noises (1) and (2).

FIG. 6B shows a delay profile 182, which is obtained by A/D (analog/digital) sampling of a signal in the above transmission line, followed by calculation in a correlator part 81 shown in FIG. 12 according to a conventional method. An A/D sampling point is represented by ○ in FIG. 6B.

In FIG. 12, a signal 181, which is a digital signal obtained after A/D conversion, is used to correlate it with specific spread codes designated in cell information in the correlator part 81 to create a delay profile 182. An outputted delay profile 182 is used to select a path in a path selection part 82. A path selection method is employed such that the predetermined number of paths are selected in decreasing order of power from the delay profile 182. Alternatively, when such paths have a difference larger than a prescribed value from the maximum path, they may not be determined as a path. The path selection part 82 transfers location information of ultimately determined paths to a spread demodulation part (not shown) as a path timing signal 183.

In the path selection method in the path selection part 82, three largest values of paths are selected in decreasing order of the value from the delay profile 182, at which time up to two points in both sides of the previously detected path are not detected even when they are large values. Furthermore, several conditions are provided such that points having a difference larger than a prescribed value from the maximum path may not be determined as a path.

The path selection part 82 detects the path (1), noise (1), and noise (2) as three paths, and outputs location information thereof as the path timing signal 183. The path (1) and noise (1) and (2) are thus selected by the conventional method.

Another conventional method is such that, in order to reduce a circuit scale for path search to obtain stable search, a signal oversampled by using a sampling signal with a first frequency is re-sampled by using a sampling signal with a second frequency lower than the first frequency at two different timings, and these re-sampling results are added together, followed by de-spreading processing for the added result in a sampling signal cycle of the second frequency, to thereby detect a path appropriate for a receiving operation (see, e.g., patent document 1).

[Patent Document 1]
Japanese Patent Laid-Open No. 2002-26765

In a receiving operation of the aforementioned conventional CDMA radio system employing the path estimation, a path may be accidentally synthesized with noise when the noise is misjudged as a path upon the path estimation, which thus degrades receiving characteristics. The same may occur in the method described in the Patent Document 1. Also, particularly in mobile terminals, reduction in power consumption is regarded as an important subject.

SUMMARY OF THE INVENTION

The present invention was proposed to solve the foregoing problems and an object thereof resides in providing a CDMA radio device capable of reducing a hardware scale and accurately estimating a path with less power consumption, and to provide a simple path estimating method used for the CDMA radio device.

A CDMA radio device according to the present invention is a CDMA radio device for transmitting and receiving signals in a CDMA system, which comprises reduction means for reducing sampling amount of input data, first path selection means for performing path selection for the data of which sampling amount is reduced in the reduction means, means for supplementing data reduced in the reduction means to the data that is targeted for the path selection in the first path selection means, and second path selection means for performing the path selection in accordance with the data supplemented with the reduced data and a result of the path selection in the first path selection means to thereby output a path estimation result.

A simple path estimating method according to the present invention is a simple path estimating method for a CDMA radio device for transmitting and receiving signals in a CDMA (Code Division Multiple Access), which comprises a first step of reducing sampling amount of input data, a second step of performing path selection for the data of which sampling amount is reduced in the first step, a third step of supplementing data reduced in the first step to the data that is targeted for the path selection in the second step; and a fourth step of performing the path selection in accordance with the data supplemented with the reduced data and a result of the path selection in the second step to thereby output a path estimation result.

Accordingly, the CDMA radio device in the present invention performs path selection in a first path selection part after reducing data in a down-sampling part, and performs path estimation in a second path estimation part after up-sampling in an up-sampling part.

Thus, in the CDMA radio device of the present invention, a path estimation method is divided into plural steps, which allowing reduction in a hardware scale and accurate path estimation with small operations, or low power consumptions.

BRIEF DESCRIPTION OF THE DRAWINGS

FIGS. 6A to 6C are diagrams illustrating a simple supplementing method for transmit diversity according to one embodiment of the present invention;

DETAILED DESCRIPTION OF THE PREFERRED EMBODIMENTS

Figure 1:
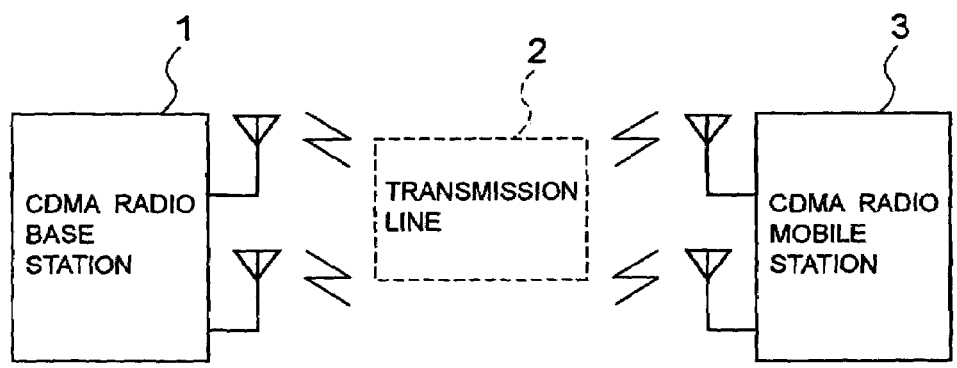
FIG. 1 is a block diagram showing a configuration of a CDMA radio system according to one embodiment of the present invention.

Embodiments of the present invention will be described below with reference to the drawings. FIG. 1 is a block diagram showing a configuration of a CDMA radio system according to one embodiment of the present invention. It will be observed from FIG. 1 that, in the CDMA radio system according to this embodiment of the present invention, a CDMA radio base station 1 and a CDMA radio mobile station 3 mutually transmit and receive radio signals via a transmission line 2.

Figure 2:
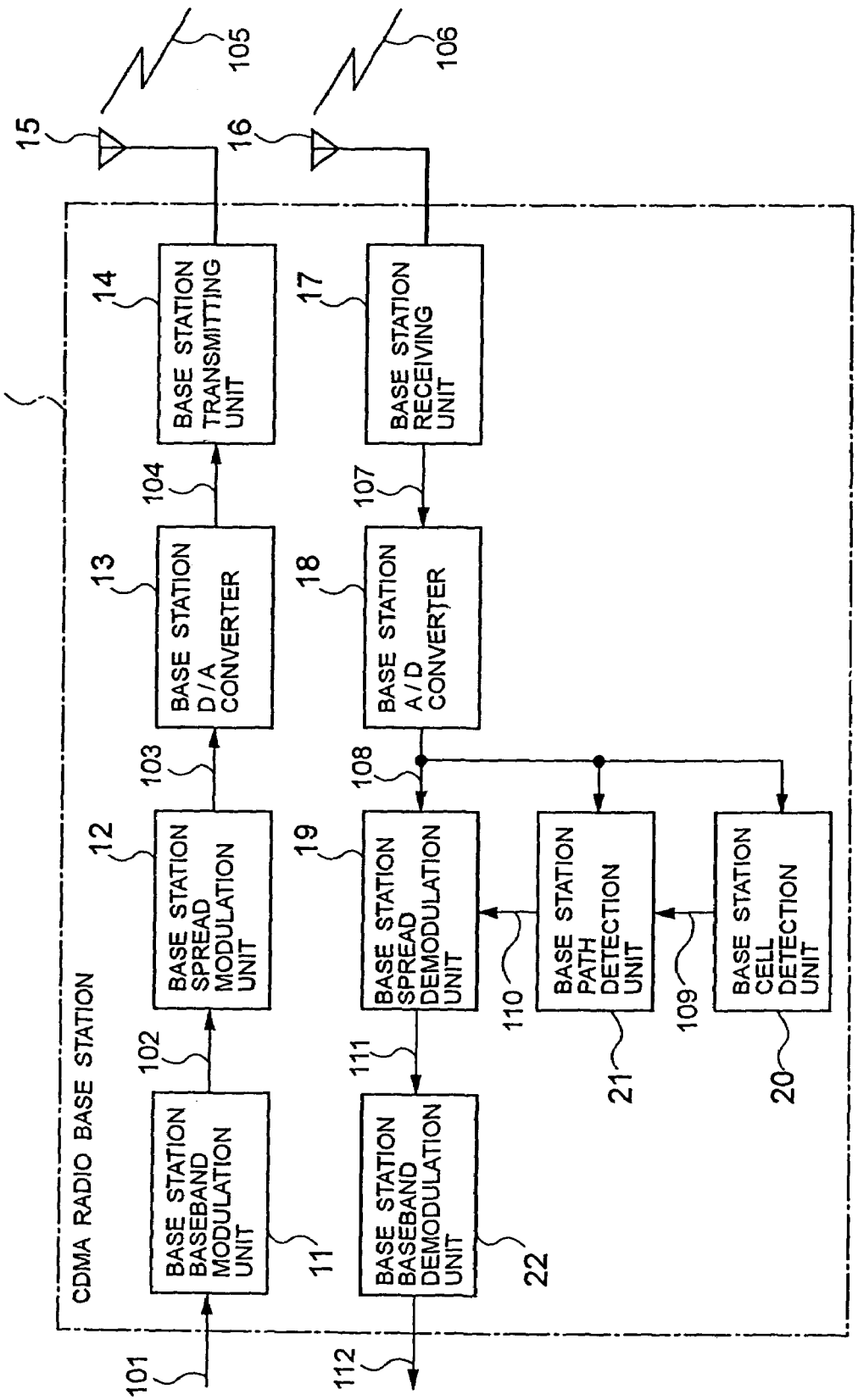
FIG. 2 is a block diagram showing a configuration of a CDMA radio base station in FIG. 1.

FIG. 2 is a block diagram showing a configuration of the CDMA radio base station 1 in FIG. 1. As shown in FIG. 2, the CDMA radio base station 1 comprises a base station baseband modulation unit 11, a base station spread modulation unit 12, a base station D/A (digital/analog) converter 13, a base station transmission unit 14, a base station transmitting antenna 15, a base station receiving antenna 16, a base station receiving unit 17, a base station A/D converter 18, a base station spread demodulation unit 19, a base station cell detection unit 20, abase station path detection unit 21, and a base station baseband demodulation unit 22.

Figure 3:
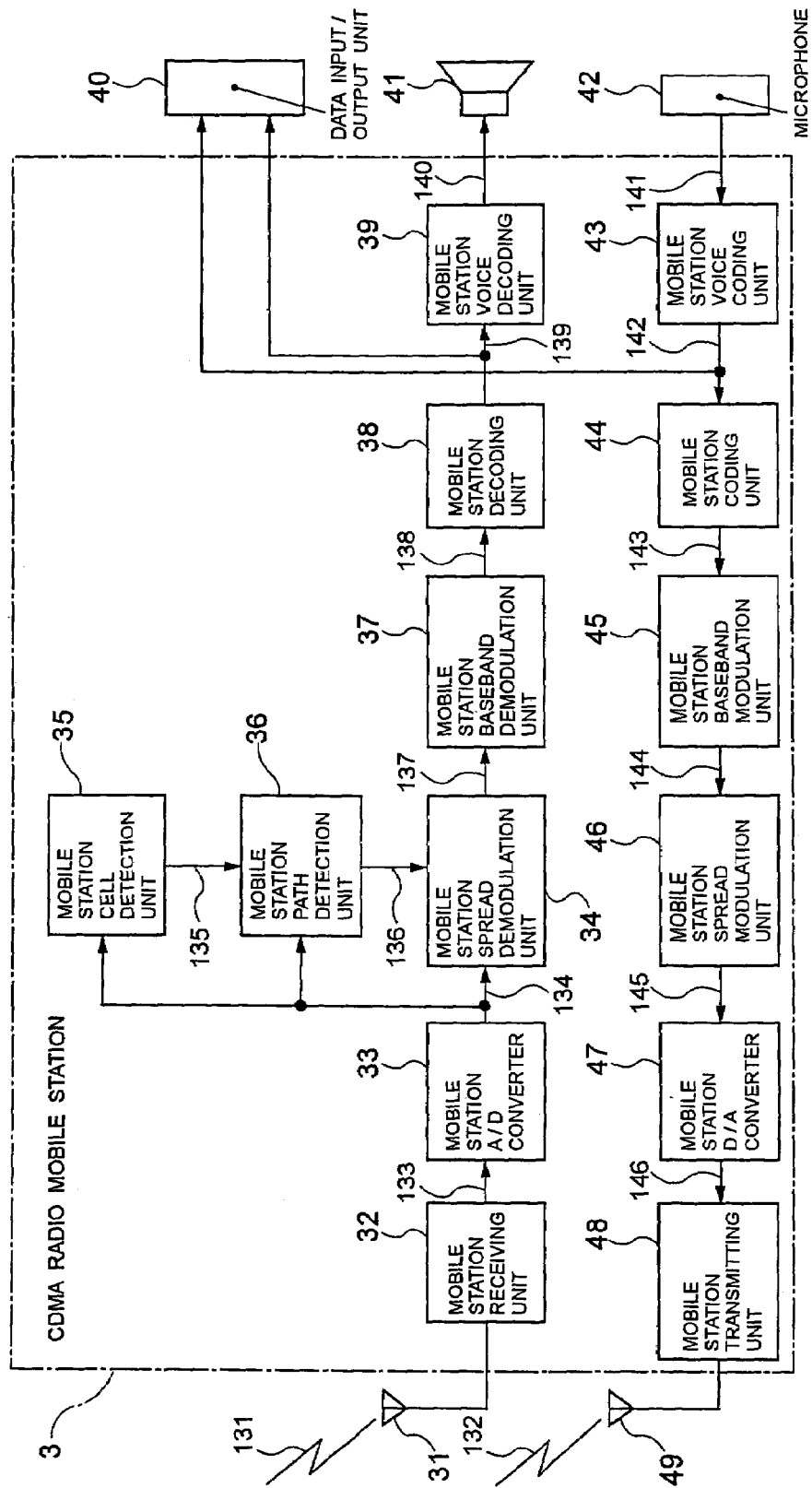
FIG. 3 is a block diagram showing a configuration of a CDMA radio mobile station in FIG. 1.

FIG. 3 is a block diagram showing a configuration of the CDMA radio mobile station 3 in FIG. 1. As shown in FIG. 3, the CDMA radio mobile station 3 comprises a mobile station receiving antenna 31, a mobile station receiving unit 32, a mobile station A/D converter 33, a mobile station spread demodulation unit 34, a mobile station cell detection unit 35, a mobile station path detection unit 36, a mobile station baseband demodulation unit 37, a mobile station decoding unit 38, a mobile station voice decoding unit 39, a data input/output unit 40 or a microphone 42, a speaker 41, a mobile station voice coding unit 43, a mobile station coding unit 44, a mobile station baseband modulation unit 45, a mobile station spread modulation unit 46, a mobile station D/A converter 47, a mobile station transmitting unit 48, and a mobile station transmitting antenna 49.

In the following, operations of the CDMA radio system according to one embodiment of the present invention will be described referring to FIGS. 1 to 3.

The CDMA radio base station 1 performs baseband modulation such as QPSK (Quadrature Phase Shift Keying) of a downlink signal 101 obtained over a network (not shown) in the base station baseband modulation unit 11, and then subjects the resultant output of baseband modulation signal 102 to spread modulation at the base station spread modulation unit 12.

An outputted spread modulation signal 103, which is a digital signal, is converted by the base station D/A converter 13 to an analog signal 104 that is subjected to conversion processing to a downlink carrier frequency, or the like, at the base station transmitting unit 14, and the obtained signal is transmitted from the base station transmitting antenna 15 as a radio wave 105. The radio wave 105 undergoes an influence of multipath or the like by way of the transmission line 2 and is then turned into a downlink multipath radio wave 131.

The CDMA radio mobile station 3 receives the downlink multipath radio wave 131 by the mobile station receiving antenna 31, and converts it from the downlink carrier frequency to a baseband frequency. The CDMA radio mobile station 3 further converts a resultant analog signal 133 to a digital signal 134 at the mobile station A/D converter 33, and then performs de-spreading of the digital signal 134 in the mobile station spread demodulation unit 34.

At this time, the mobile station cell detection unit 35 detects a cell from the digital signal 134 and notifies the mobile station path detection unit 36 of cell information and a cell timing signal 135. The mobile station path detection unit 36 detects down path timing from the cell information, cell timing signal 135 and digital signal 134, and notifies the mobile station spread demodulation unit 34 of the down path timing by a down path timing signal 136.

A signal 137 obtained by de-spreading in the mobile station spread demodulation unit 34 is demodulated to baseband in the baseband demodulation unit 37, and the demodulated signal 138 is decoded by Viterbi decoding or the like in the mobile station decoding unit 38, then the decoded signal 139 is decoded to a voice signal at the mobile station voice decoding unit 39. The decoded voice signal 140 is outputted from the speaker 41 as voice, or the decoded signal 139 is outputted from the data input/output unit 40 for the use of data communication in personal computers and the like.

On the other hand, a voice signal 141 inputted from the microphone 42 is voice-coded in the mobile station voice coding unit 43 to a voice coded signal 142 which is further coded in the mobile station coding unit 44. The coded signal 143 is then modulated by QPSK or the like, in the mobile station baseband modulation unit 45.

A signal 144 modulated in the mobile station baseband modulation unit 45 undergoes spread modulation in the mobile station spread modulation unit 46, and a digital signal 145 obtained by the spread modulation is converted by the mobile station D/A converter 47 to an analog signal 146 that is further converted to have an uplink carrier frequency at the mobile transmitting unit 48, and subsequently the resultant signal is transmitted from the mobile station transmitting antenna 49 as an up transmission radio wave 132. The up transmission radio wave 132 undergoes an influence of multipath or the like by way of the transmission line 2 and is then turned into an uplink multipath radio wave 106.

Upon receipt of the uplink multipath radio wave 106 in the base station receiving antenna 16, the CDMA radio base station 1 converts it from the uplink carrier frequency to a base band frequency in the base station receiving unit 17, and further converts the resultant analog signal 107 to a digital signal 108 by the base station A/D converter 18, and subsequently de-spreads the digital signal 108 at the base station spread demodulation unit 19.

At this time, the base station cell detection unit 20 detects cell timing from the digital signal 108 and notifies the base station path detection unit 21 of up cell information and an up cell timing signal 109. The base station path detection unit 21 detects up path timing from the up cell information, up cell timing signal 109 and digital signal 108, and notifies the base station spread demodulation unit 19 of the up path timing by an up path timing signal 110.

A signal 111 de-spread in the base station spread demodulation unit 19 is demodulated in the base station baseband demodulating unit 22, and a demodulated signal 122 is transmitted to a network. At this time, operations in the mobile station path detection unit 36 or the base station path detection unit 21 are performed in a circuit configuration shown in FIG. 4.

Figure 4:
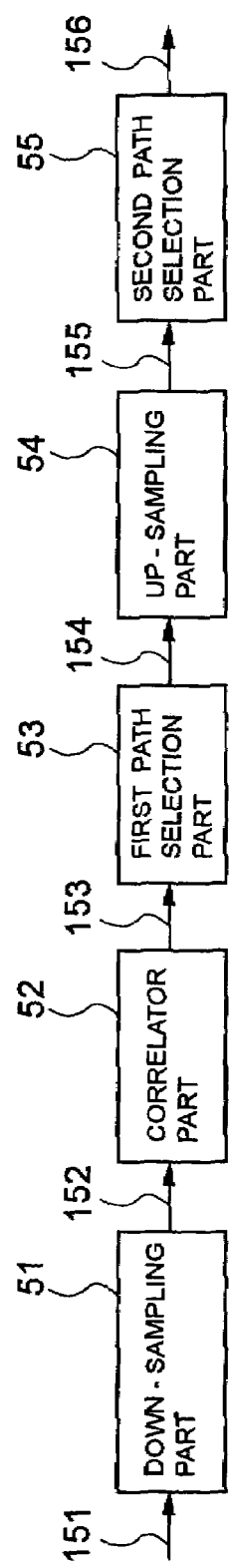
FIG. 4 is a block diagram showing a configuration of each base station path detection unit and mobile station path detection unit shown in FIG. 2.
Figure 5:
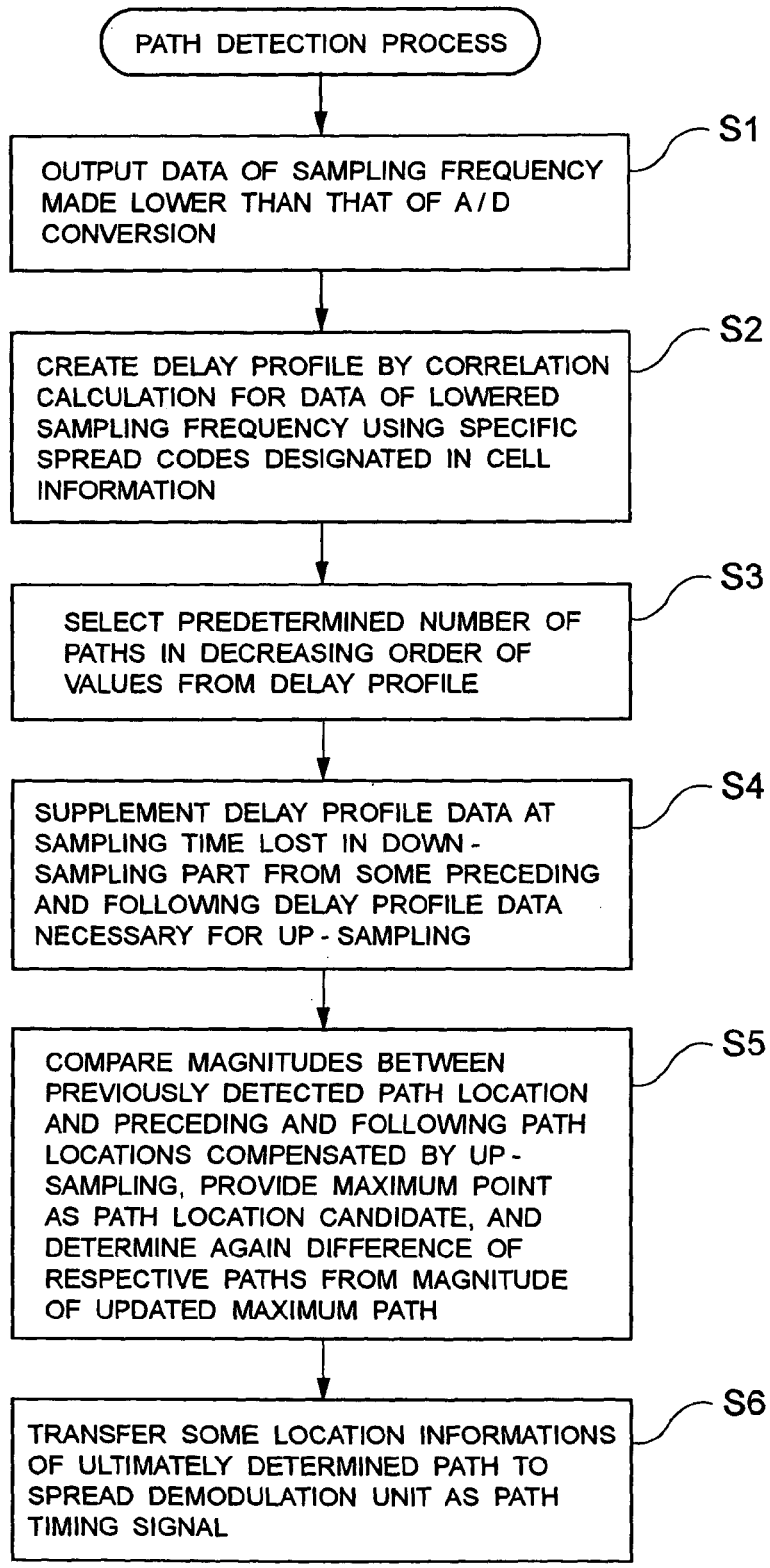
FIG. 5 is a flowchart showing a path detection process of each base station path detection unit and mobile station path detection unit shown in FIG. 2.

FIG. 4 is a block diagram showing a configuration of each base station path detection unit 21 and the mobile station path detection unit 36, and FIG. 5 is a flowchart showing a path detection process in the base station path detection unit 21 and the mobile station path detection unit 36 in FIG. 2. In FIG. 4, each of the base station path detection unit 21 and the mobile station path detection unit 36 comprises a down-sampling part 51, a correlator part 52, a first path selection part 53, an up-sampling part 54, and a second path selection part 55. It should be noted that the process shown in FIG. 5 is realizable when computers (not shown) in the base station and mobile station execute a program.

A signal 151 is a digital signal obtained after A/D conversion, and the down-sampling part 51 outputs data 152 with a sampling frequency made lower than that of A/D conversion (step S1 in FIG. 5). The correlator part 52 executes correlation calculation for the data 152 with lowered sampling frequency using specific spread codes designated in the cell information to thereby form a delay profile 153 (step S2 in FIG. 5).

The first path selection part 53 selects a path from the delay profile 153 outputted from the correlator part 52. In a path selection method employed in this case, the predetermined number of paths are selected in decreasing order of values from the delay profile 153 (step S3 in FIG. 5). At this time, several conditions are provided such that points adjacent to the previously detected path are not detected as a path, or such that points having a difference larger than a prescribed value from the maximum path may not be determined as a path (these conditions have already been described in the Description of the Related Art).

The first path selection part 53 transmits locations determined as a path in the first path selection part 53, some preceding and following delay profile data of each location which is necessary for up-sampling processing, and location information, to the up-sampling part 54 as a signal 154. The up-sampling part 54 supplements delay profile data at sampling time which has been lost in the down-sampling part 51 from the preceding and following delay profile data (step S4 in FIG. 5), and then transfers delay profile data in the locations determined as a path at the first path selection part 53, and the supplemented preceding and following delay profile data of these locations, and location information, to the second path selection part 55 as a signal 155.

The second path selection part 55 compares magnitudes between the previously detected path locations and the preceding and following path locations supplemented by up-sampling, provides the maximum point as a path location candidate, examines again differences of respective paths from the magnitude of the updated maximum path, determines not to select as a path if such difference is larger than a prescribed value, and transfers some location information of ultimately determined paths to the base station spread demodulation unit 19 or the mobile station spread demodulation unit 34 as a path timing signal 156 (steps S5 and S6 in FIG. 5).

Figure 7:
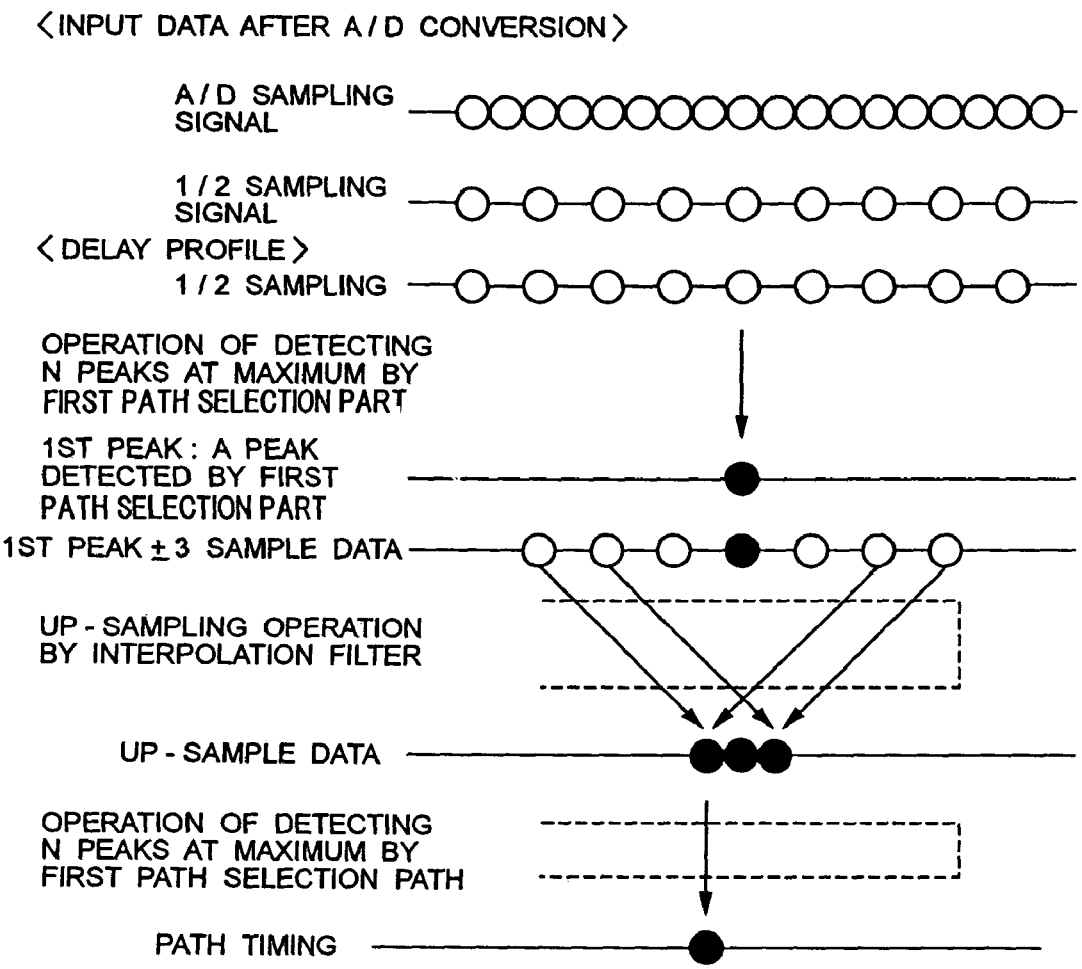
FIG. 7 is a diagram illustrating the simple supplementing method for transmit diversity according to one embodiment of the present invention.
Figure 8:
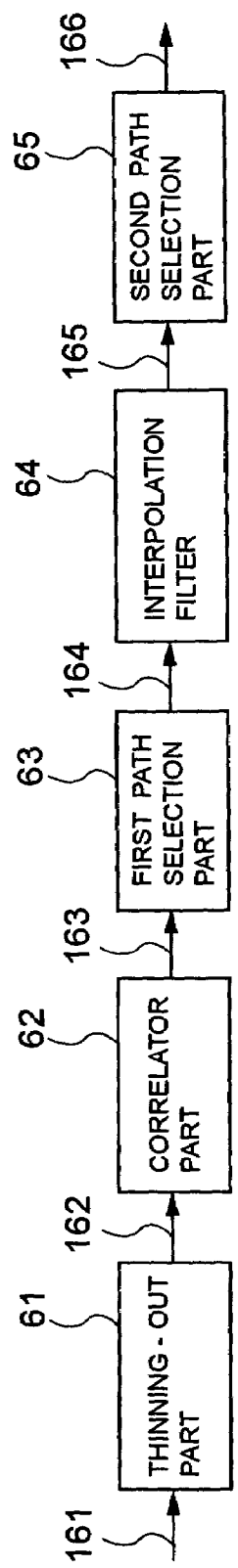
FIG. 8 is a block diagram showing a specific example of a configuration of each base station path detection unit and mobile path detection unit shown in FIG. 2.
Figure 9:
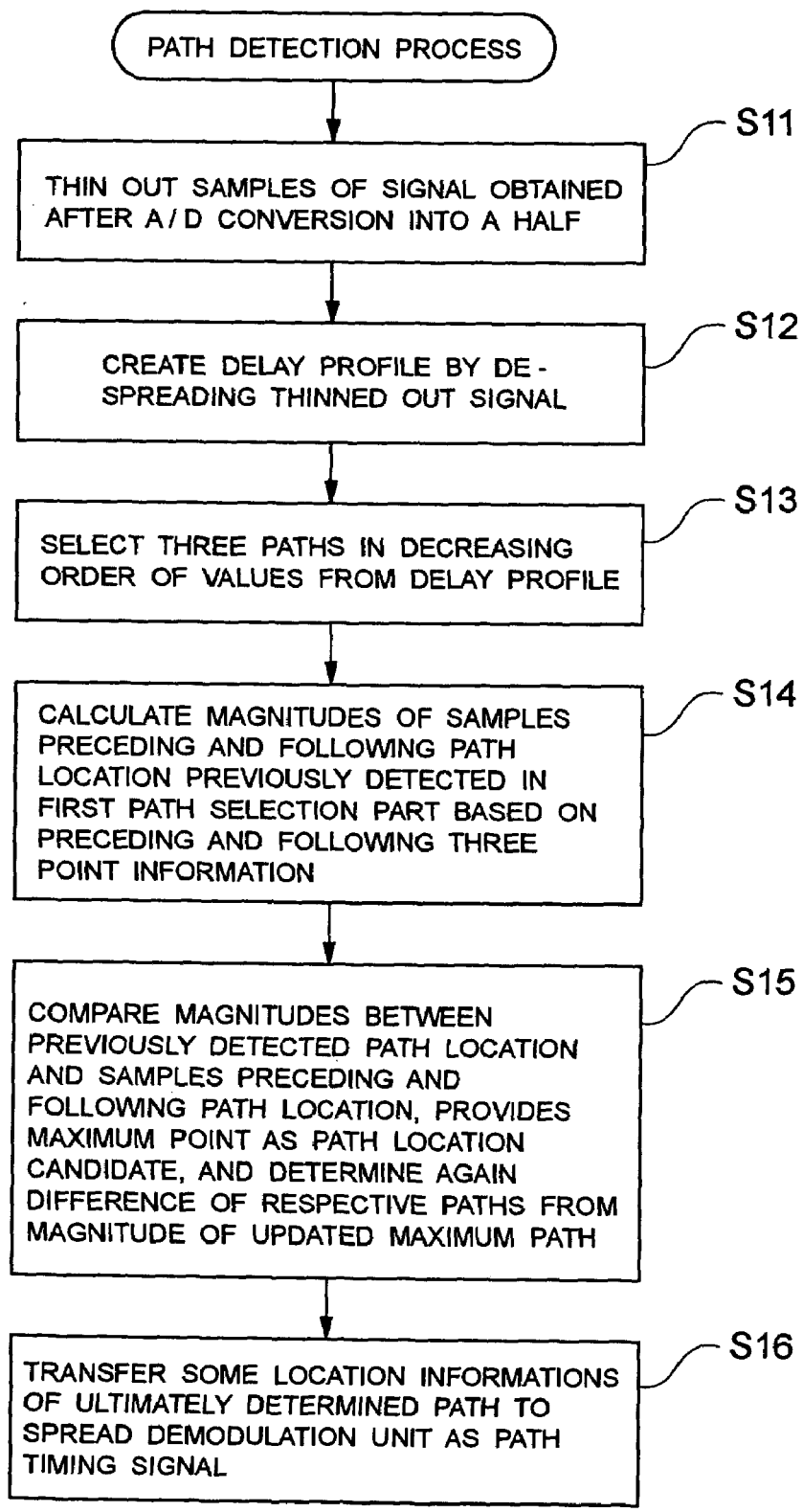
FIG. 9 is a flowchart showing a specific path detection process of each base station path detection unit and mobile station path detection unit shown in FIG. 2.

FIGS. 6A to 6C and 7 are diagrams illustrating a simple supplementing method for transmission diversity according to one embodiment of the present invention. FIG. 8 is a block diagram showing a specific configuration of each base station path detection unit 21 and mobile station path detection unit 36 shown in FIG. 2, and FIG. 9 is a flowchart showing a specific path detection process of each base station path detection unit 21 and mobile station path detection unit 36 shown in FIG. 2. Referring to these FIGS. 1 to 3 and 6 to 9, description will be made for the simple supplementing method for transmission diversity according to one embodiment of the present invention. It should be noted that the process shown in FIG. 8 is realizable when computers (not shown) in the base station and mobile station execute a program.

FIG. 6A shows characteristics of a delay profile caused by multipath in a transmission line. As shown in FIG. 6A, the delay profile is composed of magnitude information of electric power or power routes, or the like, and timing information for detecting path timing. In this transmission line, there are three paths of a path (1), a path (2) and a path (3), and lots of noise, notably, noise (1) and (2).

Figure 12:
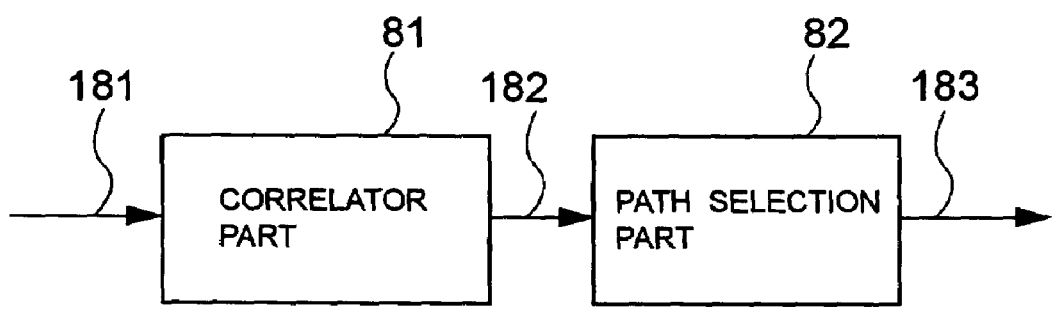
FIG. 12 is a block diagram showing an example of a configuration of a conventional path detection unit.

FIG. 6B shows a delay profile obtained by calculation according to a conventional method shown in FIG. 12 after A/D sampling in this transmission line. In FIG. 6B, sampling points are represented by ○.

According to a conventional method of selecting a path in a path selection part 82, three paths are selected in decreasing order of values from the delay profile. At this time, several conditions are provided such that up to two points adjacent to the previously detected path may not be detected as a path even when those are large values and that points having a difference larger than a prescribed value from the maximum path may not be determined as a path. Accordingly, the conventional path selection part 82 detects the path (1), the noise (1), and noise (2) as three paths, and outputs location information thereof as a path timing signal.

In FIG. 8, each of the base station path detection unit 21 and the mobile station path detection unit 36 comprises a thinning-out part 61, a correlator part 62, a first path selection part 63, an interpolation filter 64, and a second path selection part 65.

The thinning-out part 61 thins out digitized samples of a signal 161 obtained after A/D conversion into a half (step S11 in FIG. 9), and the correlator part 62 de-spreads a signal 162 resulted from the thinning-out (step S12 in FIG. 9). A delay profile 163 generated by this de-spreading has, as shown in FIG. 6C, the half number of the sampling points compared to the delay profile shown in FIG. 6B.

According to a method of selecting a path in the first path selection part 63, three paths are selected in decreasing order of values from the delay profile 163 (step 13 in FIG. 9). At this time, several conditions are provided such that points adjacent to the previously detected path may not be detected even when they are large values, and such that points having a difference larger than a prescribed value from the maximum path may not be determined as a path. The first path selection part 63 detects the path (1), path (2), and noise (2), as three paths.

Since the interpolation filter 64 is a 6-tap filter, the first path selection part 63 transfers to the interpolation filter 64 location information of points determined as a path and magnitude information of the delay profiles for three points respectively preceding and following each path point as a signal 164. The interpolation filter 64 calculates the magnitudes of samples preceding and following each path location detected by the first path selection part 63 in accordance with the information of the preceding and following three points, (step S14 in FIG. 9), and provides the calculated magnitudes to the second path selection part 65 as a signal 165.

Next, the second path selection part 65 compares the magnitudes between the previously detected path locations and the path locations calculated in the interpolation filter 64, provides the maximum point as a path location candidate, examines again differences of respective paths from the magnitude of the updated maximum path, determines not to select as a path if such difference is larger than a prescribed value, and transfers some location informations of ultimately determined paths to the base station spread demodulation unit 19 or the mobile station spread demodulation unit 34 as a path timing signal 166 (step S15, S16 in FIG. 9). FIG. 7 schematically shows these operations at data timing.

Thus, unlike the conventional method in which the path (1), noise (1) and noise (2) are selected, in this embodiment, the path (1), path (2), and noise (2) can be selected as a path, which improves characteristics thereof.

Furthermore, in this embodiment, a signal of sampling frequency lowered by down-sampling is subjected to de-spreading for path selection, which leads to reduction in a circuit scale and power consumption rather than the case where the down-sampling is not performed.

Moreover, in this embodiment, by changing operations of each of the first path selection part 63, interpolation filter 64, and second path selection part 65 as follows, more accurate path selection may be provided.

The location information of points determined as a path by the first path selection part 63 and the magnitude information of delay profiles for four points respectively preceding and following each path point are transferred as a signal 164 to the interpolation filter 64. The interpolation filter 64 calculates the magnitudes of two samples respectively preceding and following the path location previously detected by the first path selection part 63 in accordance with the information of the preceding and following four points, and provides the calculated magnitudes to the second path selection part 65.

Next, the second path selection part 65 compares the magnitudes between the previously detected path locations and the path locations calculated by the interpolation filter 64, and provides the maximum point as a path location candidate. When the magnitudes of the points preceding and following the path location candidate are 0.05 times or larger than the magnitude of the path location candidate, the second path selection part 65 examines again differences of respective paths from the magnitude of the updated maximum path, determines not to select as a path if such difference is larger than a prescribed value, and transfers some location informations of ultimately determined paths to the base station spread demodulation unit 19 or the mobile station spread demodulation unit 34 as a path timing signal.

In this embodiment, the above described operations allow elimination of the noise (2) from path candidates and also selection of only the paths (1) and (2) as paths, thereby improving the characteristics thereof.

Thus, in this embodiment, a path estimating method is divided into plural phases, enabling reduction in a hardware scale and more accurate path estimation with small operations, or low power consumptions.

Figure 10:
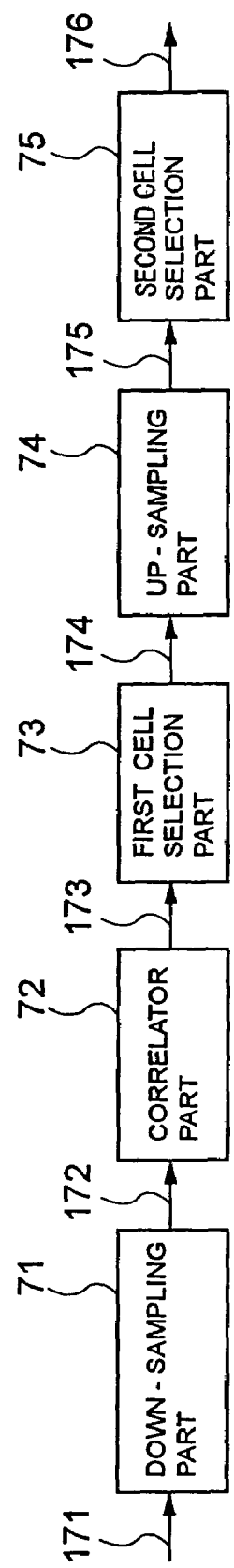
FIG. 10 is a block diagram showing an example of a configuration of each base station cell detection unit and mobile station cell detection unit according to the other embodiment of the present invention.
Figure 11:
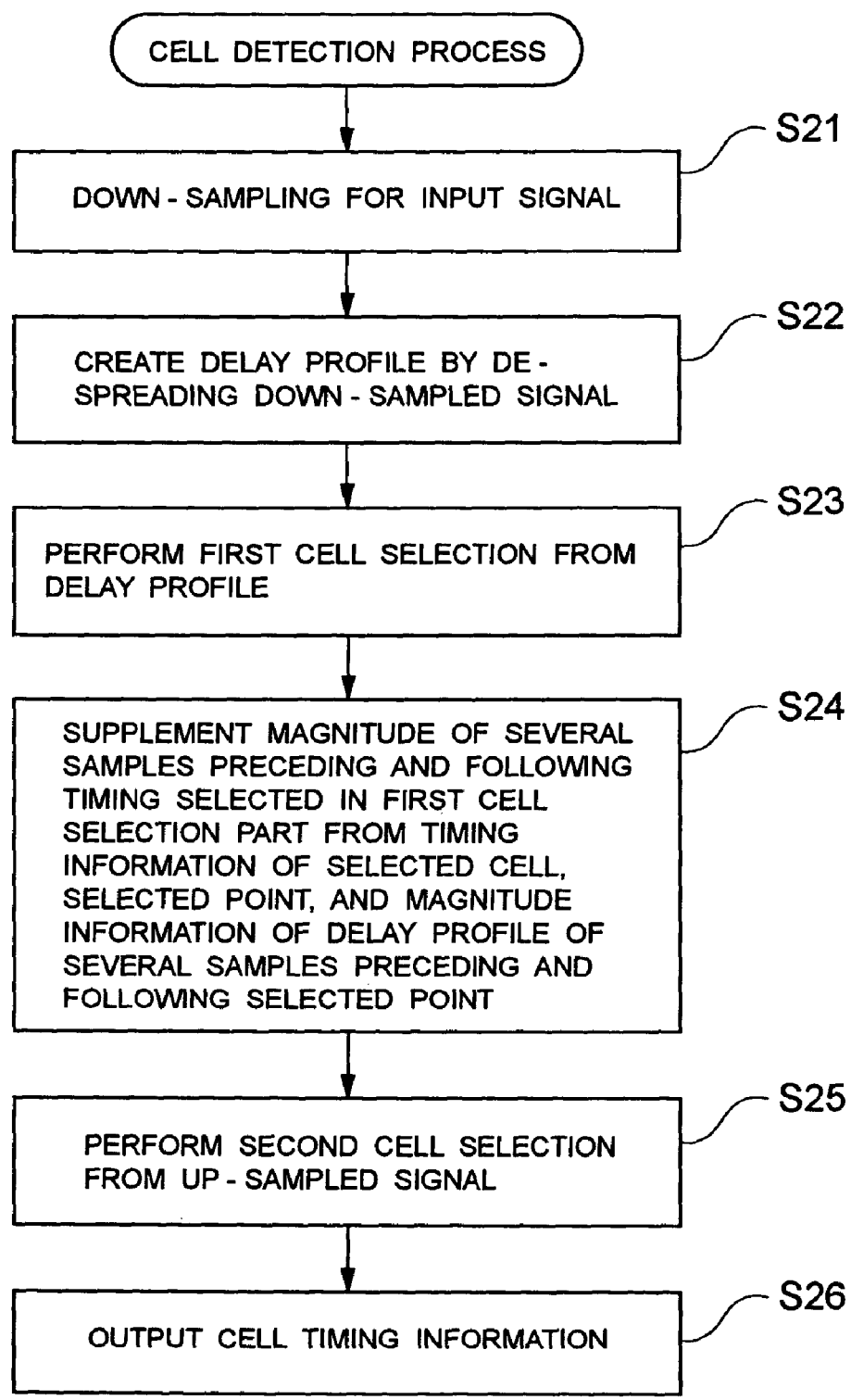
FIG. 11 is a flowchart showing a cell detection process of each base station cell detection unit and mobile station cell detection unit according to the other embodiment of the present invention.

FIG. 10 is a block diagram showing a configuration of each base station cell detection unit and mobile station cell detection unit according to the other embodiment of the present invention, and FIG. 11 is a flowchart showing a cell detection process in the both units according to the other embodiment of the present invention. The other embodiment of the present invention adopts the path estimating method of the aforementioned embodiment of the present invention in the cell detection unit. It should be noted that a CDMA radio system according to the other embodiment of the present invention, and a CDMA radio base station and CDMA radio mobile station configuring this CDMA radio system have the same configuration as the CDMA radio system, the CDMA radio base station 1, and the CDMA radio mobile station 3 according to the aforementioned embodiment of the present invention which is shown in FIGS. 1 to 3, respectively. Also, a process shown in FIG. 11 is realizable when computers (not shown) in the base station and mobile station execute a program.

In FIG. 10, each of the base station cell detection unit 20 and the mobile station cell detection unit 35 according to the other embodiment of the present invention comprises a down-sampling part 71, a correlator part 72, a first cell selection part 73, an up-sampling part 74, and a second cell selection part 75.

The base station cell detection unit 20 or the mobile station cell detection unit 35 de-spreads receiving signals from a plurality of base stations using predetermined spread codes, and detects paths concurrently with down-sampling of an input signal 171 in the down-sampling part 71 (step S21 in FIG. 11) and de-spreading of the down-sampled signal 172 in the correlator part 72 (step S22 in FIG. 11), in a cell estimation process.

A delay profile 173 created by de-spreading in the correlator part 72 is used for first cell selection in the first cell selection part 73 (step S22 in FIG. 11) which transmits timing information of the selected cell, the selected point, and magnitude information of the delay profile for several samples preceding and following the selected point to the up-sampling part 74 as a signal 174.

The up-sampling part 74 performs up-sampling of the signal 174 in accordance with the transmitted informations (step S23 in FIG. 11), supplements the magnitudes of samples preceding and following the timing selected in the first cell selection part 73 (step S24 in FIG. 11), performs again cell selection of the up-sampled signal 175 in the second cell selection part 75 (step S25 in FIG. 11), and outputs cell timing information 176 (step S26 in FIG. 11).

Thus, in this embodiment, a cell estimation method is divided into plural phases, which allows reduction in a hardware scale and more accurate cell estimation with small operations, or low power consumptions.

As described above, according to the present invention, the CDMA radio device for transmitting and receiving signals in a CDMA system, reduces sampling amount of input data and subsequently performs path selection of such data, and also supplements data reduced in the above process for the data targeted for the path selection and subsequently outputs a path estimation result by selecting a path according to the data supplemented with the reduced data and the path selection result, thereby advantageously allowing reduction in a hardware scale and more accurate path estimation with low power consumptions.

What is claimed is:

1. A CDMA radio device for transmitting and receiving signals in a CDMA (Code Division Multiple Access) system, comprising:
   reduction means for reducing sampling amount of input data;
   first path selection means for performing path selection for the data of which sampling amount is reduced in the reduction means;
   means for supplementing data reduced in the reduction means to the data that is targeted for the path selection in the first path selection means; and
   second path selection means for performing the path selection in accordance with the data supplemented with the reduced data and a result of the path selection in the first path selection means to thereby output a path estimation result.

2. The CDMA radio device according to claim 1, wherein said reduction means reduces the sampling amount of said input data by making a sampling frequency lower than that in analog/digital conversion for the input data.

3. The CDMA radio device according to claim 2, wherein said reduction means reduces the sampling amount of said input data by thinning out digitized samples of a signal obtained after said analog/digital conversion.

4. The CDMA radio device according to claim 1, further comprising
   means for creating a delay profile by correlation calculation of the data of which sampling amount is reduced using specific spread codes designated in cell information,
   wherein said first path selection means selects a path from said delay profile.

5. The CDMA radio device according to claim 4, wherein said means for supplementing data reduced in said reduction means supplements delay profile data at sampling time which is lost in said reduction means from several pieces of preceding and following delay profile data necessary for a supplementing processing.

6. The CDMA radio device according to claim 4, wherein
   said means for supplementing data reduced in the reduction means calculates magnitudes of samples preceding and following a path location detected in said first path selection means in accordance with several pieces of preceding and following delay profile data necessary for the supplementing processing, and
   said second path selection means compares the magnitudes between the preceding and following samples and the path location selected in said first path selection means to determine a maximum point as a path location candidate, and ultimately determines the path by examining difference of respective paths from magnitude of an updated maximum path.

7. The CDMA radio device according to claim 4, further comprising:
   first cell selecting means for performing cell selection for the data of which sampling amount is reduced in said reduction means;
   means for supplementing data reduced in said reduction means to the data targeted for said cell selection in said first cell selection means; and
   second cell selecting means for performing said cell selection in accordance with the data supplemented with said reduced data and a result of said cell selection in said first cell selection means to thereby output cell information.

8. A simple path estimating method for a CDMA radio device for transmitting and receiving signals in a CDMA (Code Division Multiple Access) system, comprising:
   a first step of reducing sampling amount of input data;
   a second step of performing path selection for the data of which sampling amount is reduced in the first step;
   a third step of supplementing data reduced in the first step to the data that is targeted for the path selection in the second step; and
   a fourth step of performing the path selection in accordance with the data supplemented with the reduced data and a result of the path selection in the second step to thereby output a path estimation result.

9. The simple path estimating method according to claim 8, wherein said first step includes reducing the sampling amount of said input data by making a sampling frequency lower than that in analog/digital conversion for the input data.

10. The simple path estimating method according to claim 9, wherein said first step includes reducing the sampling amount of said input data by thinning out digitized samples of a signal obtained after said analog/digital conversion.

11. The simple path estimating method according to claim 8, further comprising
    a fifth step of creating a delay profile by correlation calculation of the data of which sampling amount is reduced using specific spread codes designated in cell information,
    wherein said second step includes selecting a path from said delay profile.

12. The simple path estimating method according to claim 11, wherein said third step includes supplementing delay profile data at sampling time which is lost in said first step from several pieces of preceding and following delay profile data necessary for a supplementing processing.

13. The simple path estimating method according to claim 11, wherein
    said third step includes calculating magnitudes of samples preceding and following a path location detected in said second step in accordance with some pieces of preceding and following delay profile data necessary for the supplementing processing, and
    said fourth step includes comparing the magnitudes between the preceding and following samples and the path location selected in said second step to determine a maximum point as a path location candidate, and ultimately determines the path by examining difference of respective paths from magnitude of an updated maximum path.

14. The simple path estimating method according to claim 11, further comprising:
    a sixth step of performing cell selection for the data of which sampling amount is reduced in said first step;
    a seventh step of supplementing data reduced in said first step to the data targeted for said cell selection in said sixth step; and
    an eighth step of performing said cell selection in accordance with the data supplemented with said reduced data and a result of said cell selection in said sixth step to thereby output cell information.

* * * * *